US011323579B2

(12) United States Patent
Yamada

(10) Patent No.: US 11,323,579 B2
(45) Date of Patent: May 3, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Michihiko Yamada, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/113,797

(22) Filed: Dec. 7, 2020

(65) Prior Publication Data
US 2021/0176372 A1 Jun. 10, 2021

(30) Foreign Application Priority Data
Dec. 9, 2019 (JP) .............................. JP2019-222038

(51) Int. Cl.
H04N 1/60 (2006.01)
H04N 1/00 (2006.01)

(52) U.S. Cl.
CPC ......... *H04N 1/00411* (2013.01); *H04N 1/603* (2013.01); *H04N 1/6025* (2013.01)

(58) Field of Classification Search
None
See application file for complete search history.

(56) References Cited

U.S. PATENT DOCUMENTS

| 5,537,516 | A | * | 7/1996 | Sherman | G06K 15/02 358/1.1 |
| 5,809,366 | A | * | 9/1998 | Yamakawa | H04N 1/407 358/519 |
| 5,835,244 | A | * | 11/1998 | Bestmann | H04N 1/6025 358/523 |
| 6,897,978 | B1 | * | 5/2005 | Ohta | H04N 1/6033 358/1.9 |
| 10,742,846 | B2 | * | 8/2020 | Kishimoto | H04N 1/6075 |
| 2003/0030828 | A1 | * | 2/2003 | Soler | H04N 1/6033 358/1.9 |
| 2005/0206982 | A1 | * | 9/2005 | Hattori | H04N 1/6033 358/532 |
| 2007/0247647 | A1 | * | 10/2007 | Pettigrew | H04N 1/622 358/1.9 |

(Continued)

FOREIGN PATENT DOCUMENTS

| JP | 2007-166305 A | 6/2007 |
| JP | 2007166305 A * | 6/2007 |

(Continued)

*Primary Examiner* — Ted W Barnes
(74) *Attorney, Agent, or Firm* — Canon U.S.A., Inc. IP Division

(57) ABSTRACT

An image processing apparatus comprises a unit configured to set a color selected by a user from among colors included in scanned image data obtained by reading a reference sample as a destination color for the adjustment-target color. Then, the unit configured to set a destination color has a function to set the destination color based on first scanned image data obtained by reading a color sample as the reference sample, in which patches of a plurality of colors including colors around the adjustment-target color are printed and a function to set the destination color based on second scanned image data obtained by reading a sample document.

17 Claims, 14 Drawing Sheets

(56) References Cited

U.S. PATENT DOCUMENTS

| | | | | |
|---|---|---|---|---|
| 2008/0137952 A1* | 6/2008 | Kokemohr | ............ | G06F 3/04845 382/173 |
| 2009/0033954 A1* | 2/2009 | Bray | .................... | H04N 1/6033 358/1.9 |
| 2009/0033970 A1* | 2/2009 | Bray | ........................ | H04N 1/60 358/1.13 |
| 2010/0085587 A1* | 4/2010 | Hayward | ............. | H04N 1/6033 358/1.9 |
| 2011/0013206 A1* | 1/2011 | Mestha | .................... | H04N 1/60 358/1.9 |
| 2012/0206743 A1* | 8/2012 | Murakami | ........... | H04N 1/6055 358/1.9 |
| 2012/0262740 A1* | 10/2012 | Yamada | ................. | H04N 1/628 358/1.9 |
| 2012/0263379 A1* | 10/2012 | Bhatti | ................. | H04N 1/6033 382/167 |
| 2013/0235398 A1* | 9/2013 | Bhatti | ................. | G06K 9/4652 358/1.9 |
| 2014/0016149 A1* | 1/2014 | Matsuzaki | ........... | G06K 15/027 358/1.9 |
| 2014/0212035 A1* | 7/2014 | Chatow | .................... | G01J 3/50 382/167 |
| 2014/0253931 A1* | 9/2014 | Hashizume | ........ | G06K 15/1878 358/1.9 |
| 2015/0365564 A1* | 12/2015 | Imaseki | ............... | H04N 1/6019 358/504 |
| 2018/0013926 A1* | 1/2018 | Yamaguchi | ........ | H04N 1/00045 |
| 2018/0084155 A1* | 3/2018 | Robinson | ........... | H04N 1/00015 |
| 2018/0227463 A1* | 8/2018 | Fukase | ................. | H04N 1/00806 |
| 2021/0176372 A1* | 6/2021 | Yamada | ................. | H04N 1/603 |

FOREIGN PATENT DOCUMENTS

| | | |
|---|---|---|
| JP | 2011-205505 A | 10/2011 |
| JP | 2011205505 A * | 10/2011 |

\* cited by examiner

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to a color adjustment technique at the time of performing output processing, such as printing, based on image data.

Description of the Related Art

At the time of performing, for example, printing processing based on image data, colors within the printing-target image data are adjusted. The color adjustment at this time is performed generally by the following procedure. First, a user is caused to select a color desired to be adjusted (hereinafter, called "adjustment-target color") from the printing-target image data. Next, a plurality of candidates of a color that is the destination of the adjustment-target color (hereinafter, called "destination color") is calculated and printed and a user is caused to select a destination color therefrom. Then, a color conversion LUT is generated, by which a color signal value corresponding to the destination color is output in a case where a color signal value indicating the adjustment-target color is input.

As regards the color adjustment as described above, Japanese Patent Laid-Open No. 2007-166305 has described a technique in which a color patch of one destination color candidate and color patches of the colors around the destination color candidate are output together as a sample and a user is caused to select a destination color therefrom. Further, Japanese Patent Laid-Open No. 2011-205505 has described a technique in which a sample printed material is read optically and a user is caused to specify a portion of the color that is the destination color from the read image (scanned image) to set the destination color.

In a case where the sample printed material including the destination color is close at hand of a user, it is convenient for the user to select a destination color by making use of the printed material. In the case such as this also, with the technique of Japanese Patent Laid-Open No. 2007-166305 described above, the destination color is selected by comparing the results of the sample output including a plurality of color patches and the printed material including the destination color, and therefore, it requires time and effort of a user. Further, the technique of Japanese Patent Laid-Open No. 2011-205505 described above premises that a sample printed material including the destination color is close at hand of a user, and therefore, in a case where there is no sample printed material, it is not possible to set a destination color.

SUMMARY OF THE DISCLOSURE

An image processing apparatus that adjusts a conversion characteristic in color matching processing in a case where an image output apparatus outputs image data and includes a first setting unit configured to set a color selected by a user from among colors included in the image data to be output as an adjustment-target color; a second setting unit configured to set a color selected by a user from among colors included in scanned image data obtained by reading a reference sample as a destination color for the adjustment-target color; and a change unit configured to change, based on the destination color, a conversion characteristic in the color matching processing in a case where a color signal corresponding to the adjustment-target color is input, and the second setting unit has: a function to set the destination color based on first scanned image data obtained by reading a color sample as the reference sample, in which patches of a plurality of colors including colors around the adjustment-target color are printed; and a function to set the destination color based on second scanned image data obtained by reading a sample document of the image data to be output as the reference sample.

Further features of the disclosure will become apparent from the following description of exemplary embodiments with reference to the attached drawings.

DESCRIPTION OF THE EMBODIMENTS

Hereinafter, with reference to the attached drawings, the disclosure is explained in detail in accordance with exemplary embodiments. Configurations shown in the following embodiments are merely exemplary and the disclosure is not limited to the configurations shown schematically.

First Embodiment

In the present embodiment, a specific adjustment-target color and its destination color are set from printing-target image data and color adjustment is performed so that the output signal value corresponding to the signal value (input signal value) of the adjustment-target color becomes the output signal value corresponding to the destination color. First, the background in which the color adjustment such as this is required is reviewed.

In recent years, accompanying the improvement in performance of home and office printers, a printer capable of implementing the image quality equivalent to that of a commercial printer has appeared. Because of this, in each shop, it has been made possible to more easily perform so-called POP printing used in a sales outlet or the like. Here, POP is an abbreviation of Point of purchase advertising and refers to an advertisement for sales promotion. At this time, because of the difference in the type or the like of a printer to be used, there is a case where printing is performed with a tint different from that of a sample printed material. In the case such as this, in order to make it possible to perform printing with the same tint as that of the sample printed material, color adjustment is performed.

In the present embodiment, explanation is given by taking a so-called MFP (Multi Function Printer) as an example of an image forming apparatus that forms an image by the electrophotographic method on a printing medium in accordance with printing-target image data. However, the application range of the technique of the present disclosure is not limited to the MFP and it is possible to widely apply the technique to a general image output apparatus that outputs an image in accordance with input image data. That is, it is also possible to apply the technique to an image display device, such as a monitor and a projector, in addition to other kinds of image forming apparatus, such as a copy machine, a laser printer, and an ink jet printer.

<Hardware Configuration of Image Forming Apparatus>

Figure 1:
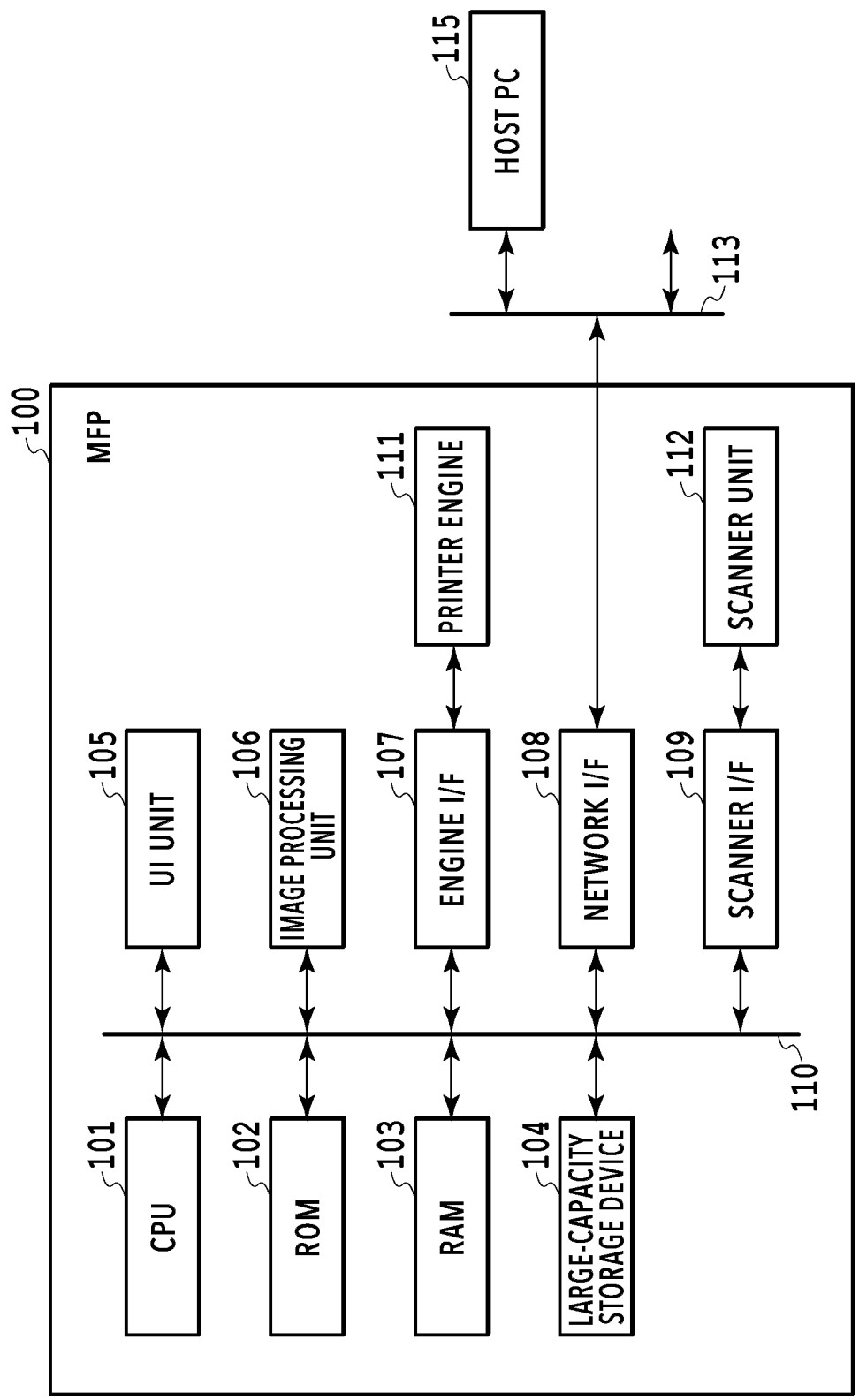
FIG. 1 is a block diagram showing a hardware configuration of an MFP.

FIG. 1 is a block diagram showing a hardware configuration of an MFP according to the present embodiment. An MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read-only memory and stores system boot programs or programs for performing control of the printer engine, and character data or character code information and the like. The RAM 103 is a volatile random-access memory and used as a work area of the CPU 101 and as a temporary storage area of various kinds of data. For example, the RAM 103 is used as a storage area for storing font data additionally registered by download, or an image file and the like received from an external apparatus. The large-capacity storage device 104 is, for example, an HDD or an SSD, in which various kinds of data are spooled, and is used for storage of programs, lookup tables (LUTs), information files, image data and the like, and used as a work area.

The UI (User Interface) unit 105 is configured by, for example, a liquid crystal display (LCD) comprising a touch panel function and displays the setting state of the MFP 100, the situation of processing being performed, an error state and the like. For example, the UI unit 105 is also used to display adjustment-target color candidates and destination color candidates at the time of performing color adjustment processing. Further, the UI unit 105 receives various user instructions, such as input of values in the various settings of the MFP 100 and selection of various buttons. For example, the setting relating to color adjustment processing, instructions of execution and the like are performed via the UI unit 105. It may also be possible for the UI unit 105 to comprise an input device, such as a hard key, separately.

The engine I/F 107 functions as an interface for controlling the printer engine 111 in accordance with instructions from the CPU 101 at the time of performing printing. Via the engine I/F 107, engine control commands and the like are transmitted and received between the CPU 101 and the printer engine 111. The network I/F 108 functions as an interface for connecting the MFP 100 to a network 113. The network 108 may be, for example, a LAN or a public switched telephone network (PSTN). The printer engine 111 forms a multi-colored image on a printing medium, such as paper, by using color materials (here, toner) of a plurality of colors (here, four colors of CMYK) based on print image data received from the side of the system bus 110. The scanner I/F 109 functions as an interface for controlling the scanner unit 112 in accordance with instructions from the CPU 101 at the time of performing reading of a document by the scanner unit 112. Via the scanner I/F 109, scanner unit control commands and the like are transmitted and received between the CPU 101 and the scanner unit 112. The scanner unit 112 generates read image data by optically reading a document under the control of the CPU 101 and transmits the read image data (scanned image data) to the RAM 103 or the large-capacity storage device 104 via the scanner I/F 109.

In the present embodiment, the case is supposed where, for example, performing printing with the printer engine 111 by using input image data for POP printing results in the printed material whose tint is different from that of the sample printed material. Then, a user who has recognized that the tint in the printing results is different from that of the sample printed material operates the UI unit 105 and inputs instructions to perform color adjustment for the color whose tint is different and for which it is to perform adjustment (that is, adjustment-target color). Then, based on the explicit instructions to perform color adjustment, the color matching LUT that specifies the conversion characteristic in color matching processing is modified and a color matching LUT having a new conversion characteristic capable of implementing the color aimed at by the user for the adjustment-target color is obtained. That is, the generation of a new color matching LUT is performed only in a case where explicit instructions are input from a user. Then, at the time of normal printing processing, the image processing unit 106 does not perform the generation of a new color matching LUT each time but performs color matching processing by using the predetermined color matching LUT. In the following explanation, the adjustment of a specific color based on the explicit instructions by a user described above is called "spot color adjustment". Further, the sample printed material is called "sample document".

<Configuration of Image Processing Apparatus>

Figure 2:
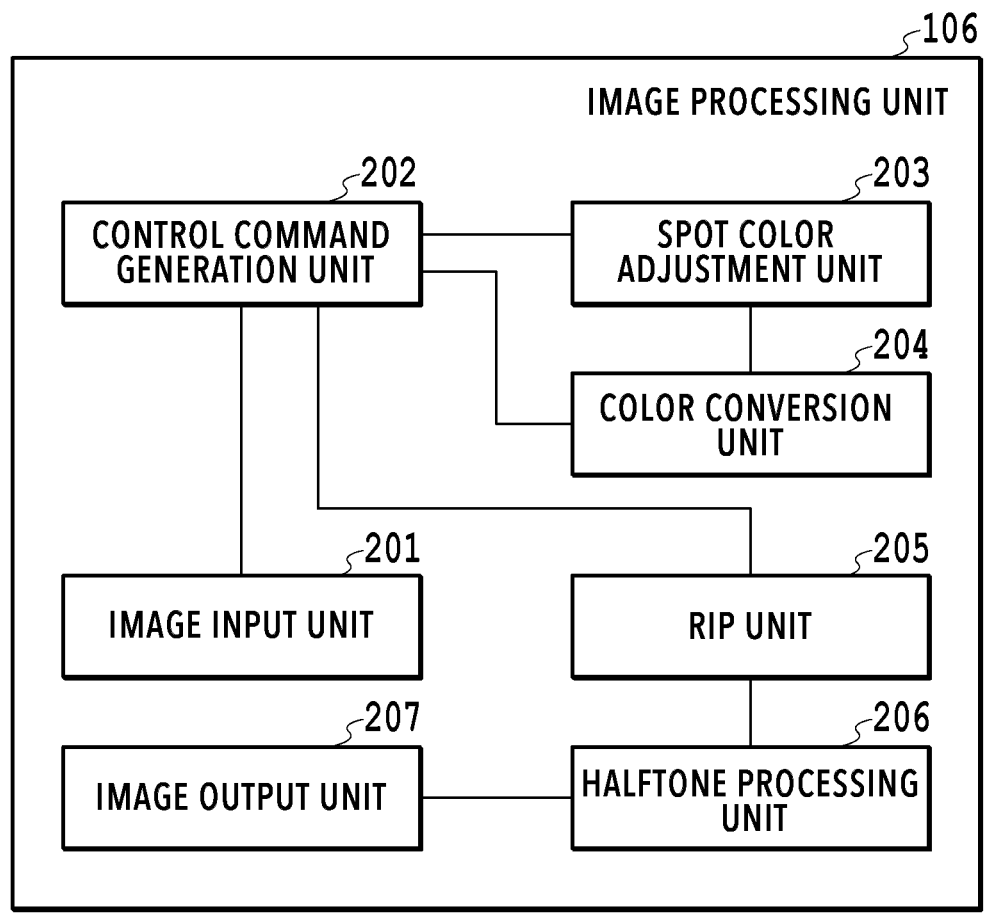
FIG. 2 is a function block diagram showing an internal configuration of an image processing unit.

FIG. 2 is a function block diagram showing an internal configuration of the image processing unit 106. The image processing unit 106 comprises an image input unit 201, a control command generation unit 202, a spot color adjustment unit 203, a color conversion unit 204, a RIP unit 205, a halftone processing unit 206, and an image output unit 207. Each of these function units is implemented by the CPU 101 reading programs stored in the ROM 102 onto the RAM 103 and executing the programs. Alternatively, part or all of these function units may be implemented by hardware, such as an ASIC or an electronic circuit.

The image input unit 201 receives the input of printing-target image data. The image data is input from, for example, a host PC 115 via the network 113 and the network I/F 108. Alternatively, image data stored in the large-capacity storage device 104 may be input. The image data that is input is two-dimensional data including the plane of each color of red (R), green (G), and blue (B) in which a color signal corresponding to the sRGB color space independent of the printer engine 111 is represented by eight bits (256 tones). The sRGB refers to the standard of the RGB color space specified by the IEC (International Electrotechnical Commission). The image data that is input to the image input unit 201 is sent to the control command generation unit 202.

The control command generation unit 202 obtains the image data in the CMYK color space that can be handled by the printer engine 111 by controlling the spot color adjustment unit 203 and the color conversion unit 204. Then, the control command generation unit 202 generates the control command of the RIP unit 205 (hereinafter, described as "RIP control command") including the obtained image data in the CMYK color space. The generated RIP control command is sent to the RIP unit 205.

The spot color adjustment unit 203 adjusts the color matching LUT used for the color matching processing under the control of the control command generation unit 202 based on the instructions to perform spot color adjustment by a user. The color matching processing refers to processing to convert the color space of the output-target image data into a color space that matches with the color reproducibility of the image output apparatus at the time of the image output apparatus outputting an image. In a case of the present embodiment, the color matching processing means processing to convert the color space of the printing-target input image data received by the image input unit 201 from sRGB that does not depend on the printer engine 111 into RGB that depends on the printer engine 111. In the following, the so-called device-dependent RGB color space, which depends on the color reproducibility of the printer engine 111, is described as "devRGB". The color matching LUT stores the input values and the output values in association with each other at a plurality of discrete points (corresponding to grid points, to be described later) within the color space. The spot color adjustment unit 203 modifies the conversion characteristic so that in a case where the color signal corresponding to the adjustment-target color is input to the color matching LUT prepared in advance, the same color signal as that of the destination color is output. Here, it is assumed that the adjustment-target color is referred to as a first color, the color that is output in a case where the first color is input to the predetermined color matching LUT is referred to as a second color, and the color corresponding to the destination color is referred to as a third color. The modification of the conversion characteristic means changing the color that is output in a case where the first color is input from the second color to the third color. In other words, a new color matching LUT is generated by which, in a case where the adjustment-target color is input as the first color, the third color is output. Details of the processing in the spot color adjustment unit 203 will be described later.

The color conversion unit 204 converts the pixel values of each pixel of the input image data from the values (sRGB values) represented in the sRGB color space into the values (CMYK values) represented in the CMYK color space by using the color matching LUT and the color conversion LUT, both described above. The color matching LUT and the color conversion LUT are stored in the RAM 103 or the large-capacity storage device 104. First, the color conversion unit 204 performs the color matching processing to convert the pixel values of the input image data from the sRGB values into the devRGB values by using the color matching LUT. At this time, by using the color matching LUT generated newly by the above-described spot color adjustment, the adjustment-target color included in the input image data becomes close to the destination color, which is the color aimed at by the adjustment-target color. Further, the color conversion unit 204 performs color conversion processing using two color conversion LUTs, that is, a first color conversion LUT for converting the color space from the devRGB color space into the Lab color space and a second color conversion LUT for performing color conversion from the Lab color space into the CMYK color space, for the image data for which the color matching processing has been performed. Due to this, image data in which each pixel is represented by the CMYK values is obtained. "Lab" indicates "L*a*b*" in a simplified manner, which is the three-dimensional visually uniform color space independent of the printer engine 111, which takes into consideration the human visual characteristic and is determined by the CIE (International Commission on Illumination). By performing the color conversion via the standard color space independent of the printer engine 111, the reproduction of the color that a human being recognizes as the same color is implemented. The processing in the color conversion unit 204 is not limited to the contents described above. For example, it may also be possible to create one LUT that combines the color matching LUT and the two color conversion LUTs and perform conversion en bloc from the sRGB color space into the CMYK color space. Further, a configuration may also be accepted in which the color matching processing and the color conversion processing are performed for image data based on a function formula in place of the LUT.

The RIP (Raster Image Processor) unit 205 generates image data in the raster format represented in the CMYK color space (hereinafter, described as "CMYK raster image data") by using the RIP control command generated by the control command generation unit 202.

The halftone processing unit 206 generates print image data (halftone image data) represented by halftone dots, which the printer engine 111 can process, by performing halftone processing for the CMYK raster image data generated by the RIP unit 205. In many cases, it is normally possible for the printer engine 111 to output image data with a number of tones smaller than that of the input image data, such as two tones, four tones, and 16 tones. Because of this, the halftone processing is performed so that it is possible to represent a stable halftone even in a case where the image data is printed and output with a small number of tones as described above. The method of halftone processing includes the density pattern method, the systematic dither method, the error diffusion method and the like and it is possible to apply these publicly known methods.

In a case of receiving print image data from the halftone processing unit 206, the image output unit 207 transmits the print image data to the printer engine 111 via the engine I/F 107. The CPU 100 gives instructions to form an image based on the print image data to the printer engine 111. The printer engine 111 forms and outputs a color image in accordance with the input print image data onto a printing medium by performing each process, such as exposure, development, transfer, and fixing.

<Details of Spot Color Adjustment Unit>

Figure 3:
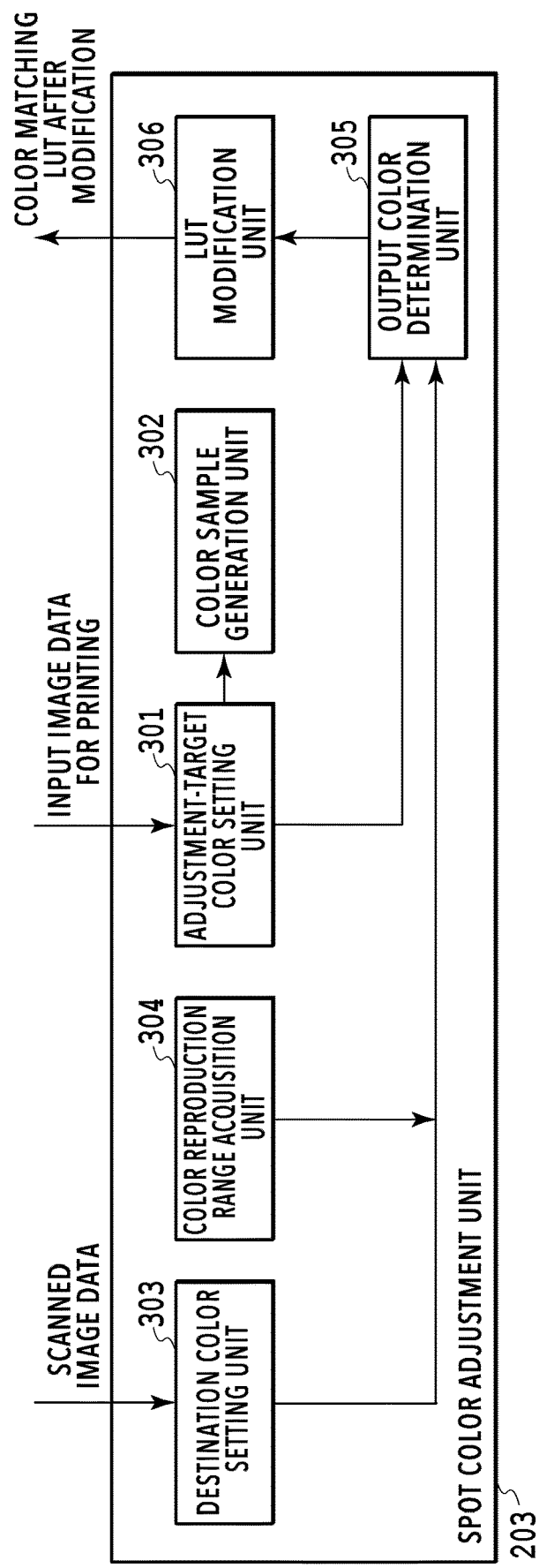
FIG. 3 is a function block diagram showing an internal configuration of a spot color adjustment unit according to a first embodiment.

FIG. 3 is a function block diagram showing an internal configuration of the spot color adjustment unit 203 according to the present embodiment. The spot color adjustment unit 203 has an adjustment-target color setting unit 301, a color sample generation unit 302, a destination color setting unit 303, a color reproduction range acquisition unit 304, an output color determination unit 305, and an LUT modification unit 306. Each of these function units is implemented by the CPU 101 reading programs stored in the ROM 102 onto the RAM 103 and executing the programs. Alternatively, part or all of these function units may be implemented by hardware, such as an ASIC and an electronic circuit. In the following, each function unit is explained.

Figure 4:
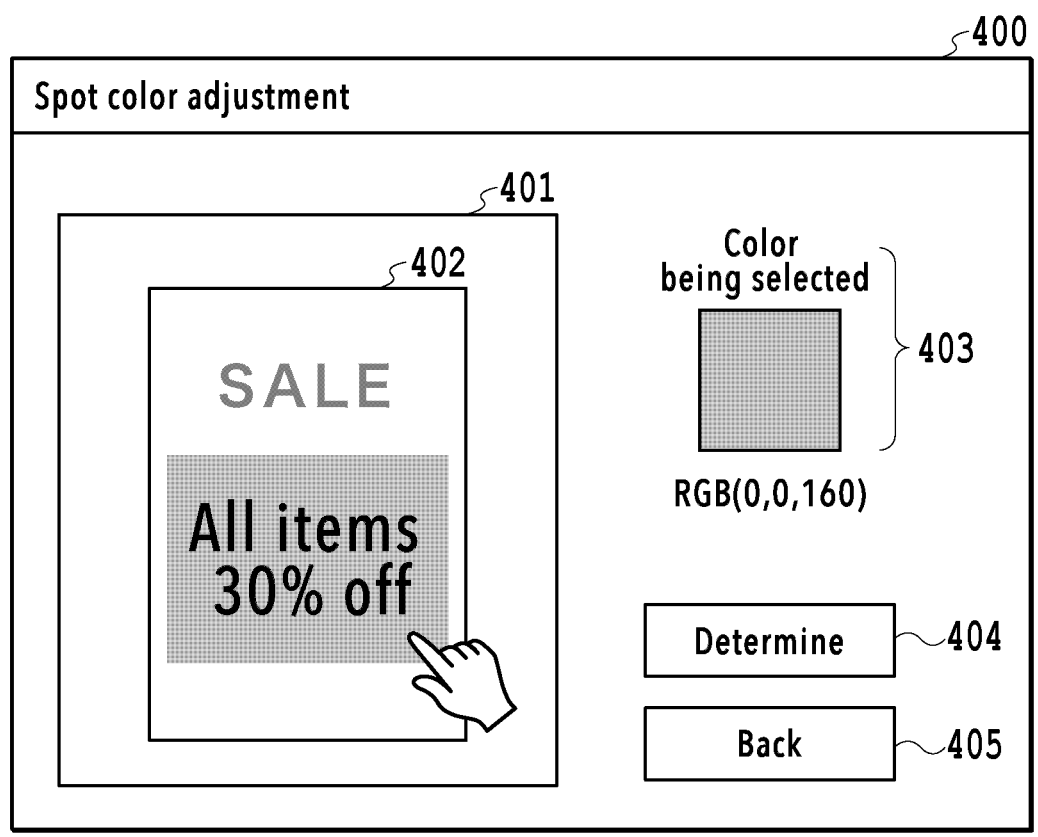
FIG. 4 is a diagram showing an example of a Spot color adjustment UI screen.
Figure 5:
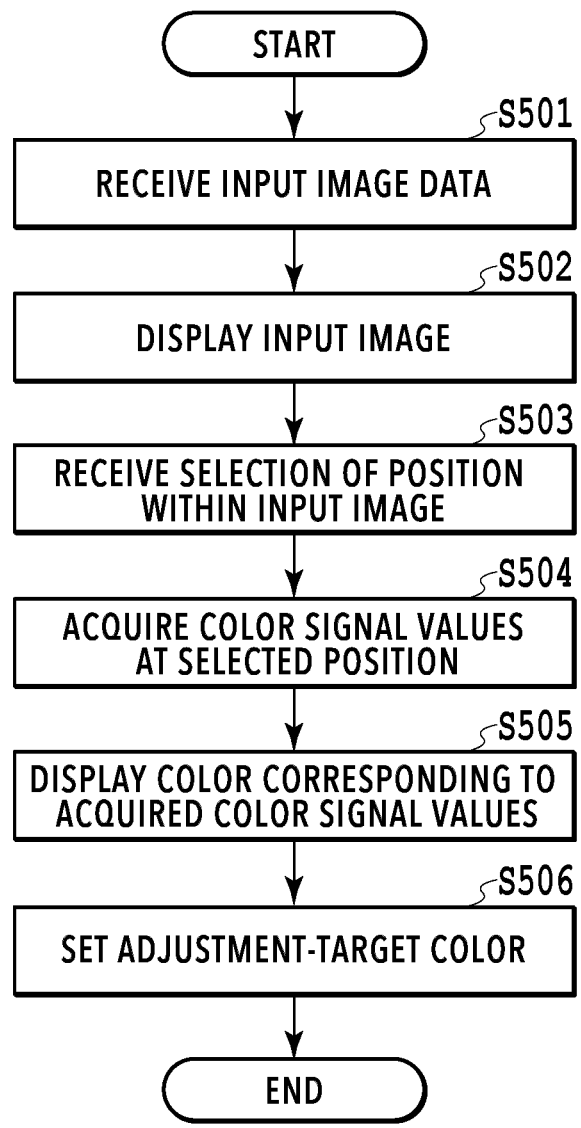
FIG. 5 is a flowchart indicating a flow of processing to set a specific color (adjustment-target color) that is a target of spot color adjustment.

The adjustment-target color setting unit 301 performs processing to set a specific color (adjustment-target color) that is the target of spot color adjustment among the colors configuring a printing-target input image. Detailed explanation is given with reference to FIG. 4 and FIG. 5. In the present specification, symbol "S" in the explanation of the flowchart means a step. First, the adjustment-target color setting unit 301 receives printing-target input image data from the control command generation unit 202 (S501). Then, the adjustment-target color setting unit 301 displays the input image on the Spot color adjustment UI screen displayed on the UI unit 105 based on the received input image data (S502). FIG. 4 shows an example of the Spot color adjustment UI screen (hereinafter, simply called "UI screen") according to the present embodiment. At the time of setting an adjustment-target color, as shown in FIG. 4, first, an input image 402 is displayed within an image display area 401. Then, user selection for the displayed input image 402, that is, selection of a specific position is received (S503). This selection is implemented by a user performing a touch operation to an area of "All items 30% off" in the input image 402 within the image display area 401 and by coordinate information (x, y) corresponding to the position of the touch operation being acquired. In place of the touch operation, it may also be possible to select a specific position by a pointing device, such as a mouse. Here, x and y indicate a position x (+ in the rightward direction) in the horizontal direction on a two-dimensional plane and a position y (+ in the downward direction) in the vertical direction, respectively, with the upper left-most position of the input image 402 being taken to be the origin (0, 0). Following the above, based on the acquired coordinate information, the color values corresponding to the position relating to the user selection are acquired (S504). Here, each pixel of the input image has the sRGB values, and therefore, the sRGB values at the position selected by the user are acquired. Then, the color corresponding to the acquired sRGB values is displayed in an adjustment-target color display area 403 within a UI screen 400 (S505). At this time, in the vicinity of the adjustment-target color display area 403, the acquired sRGB values (three values of R, G, B. Here, (R=0, G=0, B=160)) are displayed together. The input image that is displayed in the image display area 401 and the color that is displayed in the adjustment-target color display area 403 are displayed in the color space of RGB that depends on the monitor device by using a monitor color conversion LUT that depends on the monitor device mounted by the UI unit 105. Lastly, in response to the pressing down of a Determine button 404 by the user, the color being displayed in the adjustment-target color display area 403 is set as the adjustment-target color (S506). Then, information on the adjustment-target color thus set is sent to the output color determination unit 305.

Figure 6A:
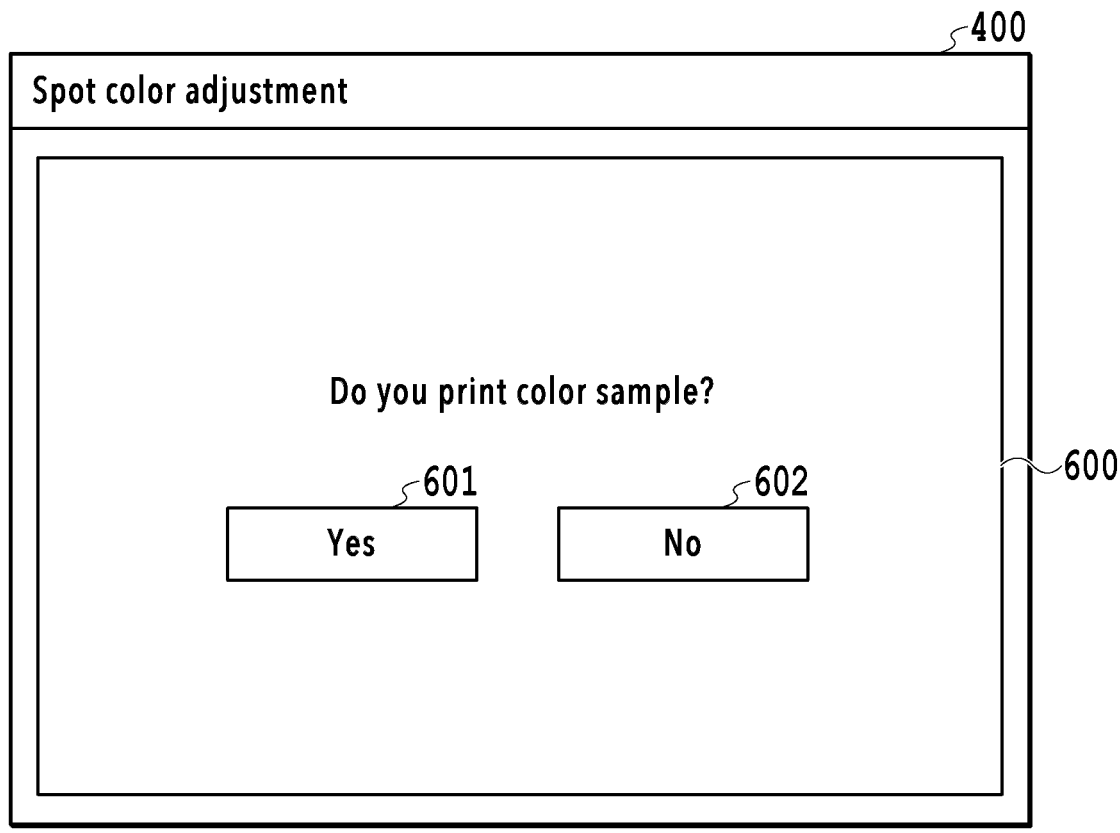
FIG. 6A is a diagram showing a state of a UI screen for obtaining a color sample and FIG. 6B is a diagram showing a color sample obtained by printing a patch image.
Figure 6B:
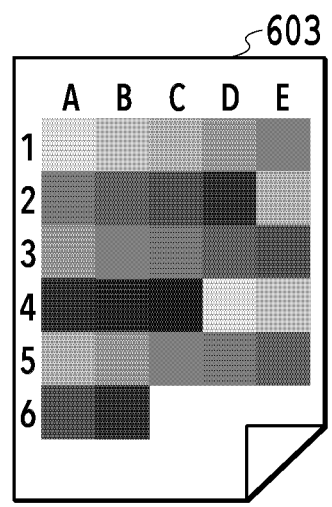
Figure 7:
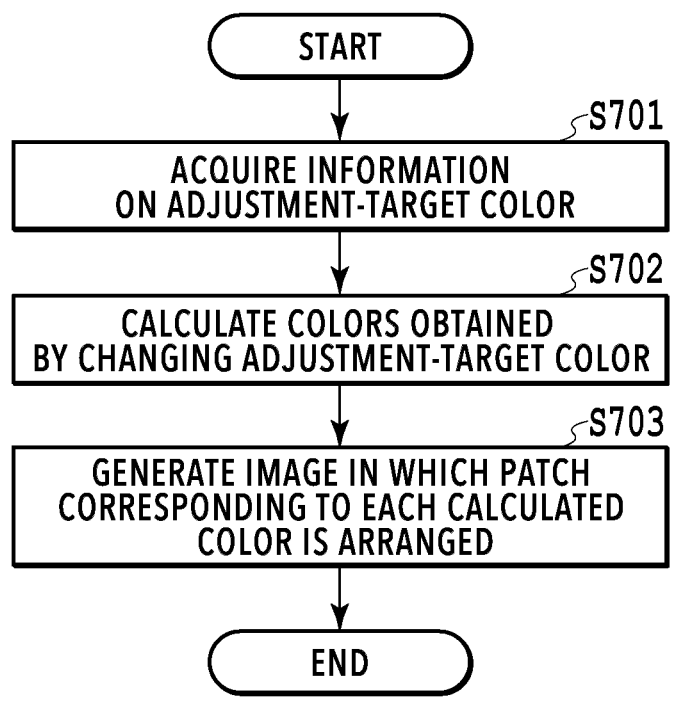
FIG. 7 is a flowchart showing a flow of processing to generate a patch image.

The color sample generation unit 302 generates a patch image including a patch group corresponding to a plurality of colors of destination color candidates, which is a base of a color sample for determining the color that is the destination of the adjustment-target color (destination color). FIG. 6A is a diagram showing a state of the UI screen 400 for obtaining the color sample. As shown in FIG. 6A, first, the color sample generation unit 302 displays a message window 600 to check whether or not a user needs the color sample on the UI screen 400. In a case where the color sample is necessary, that is, in a case where the sample printed material including the aimed color is not close at hand, the user gives instructions to print the color sample by pressing down a "Yes" button 601. On the other hand, in a case where the sample document is close at hand and the color sample is not necessary, the user presses down a "No" button 602. In this case, the color sample generation unit 302 does not operate. Then, the color sample generation unit 302 having detected the pressing down of the "Yes" button 601 acquires the information on the adjustment-target color set based on the user selection from the adjustment-target color setting unit 301 and generates a patch image for obtaining a color sample 603, for example, as shown in FIG. 6B, based on the information. In a case of the patch image for obtaining the color sample 603 in FIG. 6B, the patch image is such that a square (for example, square of 945 pixels×945 pixels) corresponding to each of 27 colors including the adjustment-target color is arranged with a resolution of 600 dpi so that there are five squares in the horizontal direction (X direction) and there are six squares in the vertical direction (Y direction). Additionally, alphabetical letters A to E are added along the horizontal direction (X direction) at the top of the patch image and numbers 1 to 6 are added along the vertical direction (Y direction) at the left end of the patch image, whereby the user can specify a desired patch with a patch number (information which makes it possible to distinguish each patch) consisting of a combination of an alphabetical letter and a number in a UI screen for setting a destination color, which will be described later. The color of each patch at this time is the color specified by sRGB. The total number of patches and the way the patches are arranged are arbitrary. Each patch may have a different square size and the shape may be different from a square. Further, the resolution is not limited to 600 dpi. Here, with reference to the flowchart in FIG. 7, detailed explanation is given. Symbol "S" in the flowchart in FIG. 7 means a step.

First, the color sample generation unit 302 acquires information on the adjustment-target color set by the adjustment-target color setting unit 301 (S701). Next, the color sample generation unit 302 calculates a plurality of colors obtained by changing the set adjustment-target color stepwise (S702). The color calculated here (here, 27 colors including the adjustment-target color) is the color of each patch. As a method of changing the color at this time, for example, a method is adopted in which a predetermined change amount is added to the adjustment-target color for each of R, G, and B. Here, the sRGB values indicating the color of the patch in a case where the change amounts are taken to be x, y, and z are found by formula (1) to formula (3) below.

$$R_{out}(i) = R_{in} + x(i) + y(i) + z(i) \qquad \text{formula (1)}$$

$$G_{out}(i) = G_{in} + x(i) + y(i) + z(i) \qquad \text{formula (2)}$$

$$B_{out}(i) = B_{in} + x(i) + y(i) + z(i) \qquad \text{formula (3)}$$

In formula (1) to formula (3) described above, "$R_{out}$", "$G_{out}$", and "$B_{out}$" indicate the R value, the G value, and the B value, respectively, after the adjustment-target color is changed. Further, "$R_{in}$", "$G_{in}$", and "$B_{in}$ (i)" indicate the R value, the G value, and the B value, respectively, in the adjustment-target color. Furthermore, i indicates the change number and the change amount in accordance with the change number is specified by a table as shown in Table 1. Here, the color is changed with the sRGB color space being taken as a reference, but this is not limited and for example, the color may be changed with the Lab color space, the Luv color space or the like being taken as a reference.

TABLE 1

| Change No. | i | 1 | 2 | 3 | 4 | 5 | 6 | 7 | 8 | 9 |
|---|---|---|---|---|---|---|---|---|---|---|
| Change amount | x(i) | −5 | −5 | −5 | −5 | −5 | −5 | −5 | −5 | −5 |
| | y(i) | −5 | −5 | −5 | 0 | 0 | 0 | 5 | 5 | 5 |
| | Z(i) | −5 | 0 | 5 | −5 | 0 | 5 | −5 | 0 | 5 |
| Change No. | i | 10 | 11 | 12 | 13 | 14 | 15 | 16 | 17 | 18 |
| Change amount | x(i) | 0 | 0 | 0 | 0 | 0 | 0 | 0 | 0 | 0 |
| | y(i) | −5 | −5 | −5 | 0 | 0 | 0 | 5 | 5 | 5 |
| | Z(i) | −5 | 0 | 5 | −5 | 0 | 5 | −5 | 0 | 5 |
| Change No. | i | 19 | 20 | 21 | 22 | 23 | 24 | 25 | 26 | 27 |
| Change amount | x(i) | 5 | 5 | 5 | 5 | 5 | 5 | 5 | 5 | 5 |
| | y(i) | −5 | −5 | −5 | 0 | 0 | 0 | 5 | 5 | 5 |
| | Z(i) | −5 | 0 | 5 | −5 | 0 | 5 | −5 | 0 | 5 |

Lastly, a patch image is generated in which a square patch corresponding to each color obtained by changing the adjustment-target color is arranged (S703). By printing and outputting the patch image thus obtained, the color sample is obtained. Then, after generating the patch image that is the base of the color sample as described above, the color sample generation unit 302 converts the sRGB values of each patch into the devRGB values by using a predetermined conversion table (color matching LUT). Table 2 below is an example of the color matching LUT.

TABLE 2

| Input (sRGB) | | | Output (devRGB) | | |
|---|---|---|---|---|---|
| R | G | B | R | G | B |
| 0 | 0 | 0 | 0 | 0 | 0 |
| 0 | 0 | 16 | 0 | 0 | 16 |
| 0 | 0 | 32 | 0 | 0 | 27 |
| 0 | 0 | 48 | 0 | 0 | 38 |
| 0 | 0 | 64 | 0 | 0 | 49 |
| 0 | 0 | 80 | 0 | 0 | 60 |
| 0 | 0 | 96 | 0 | 0 | 71 |
| 0 | 0 | 112 | 0 | 0 | 82 |
| 0 | 0 | 128 | 0 | 0 | 93 |
| 0 | 0 | 144 | 0 | 0 | 104 |
| 0 | 0 | 160 | 0 | 0 | 115 |
| . | . | . | . | . | . |
| . | . | . | . | . | . |
| . | . | . | . | . | . |

The data on the patch image after being converted based on the color matching LUT as shown in Table 2 described above is sent to the printer engine 111 via the control command generation unit 202 and printed and output.

Figure 8A:
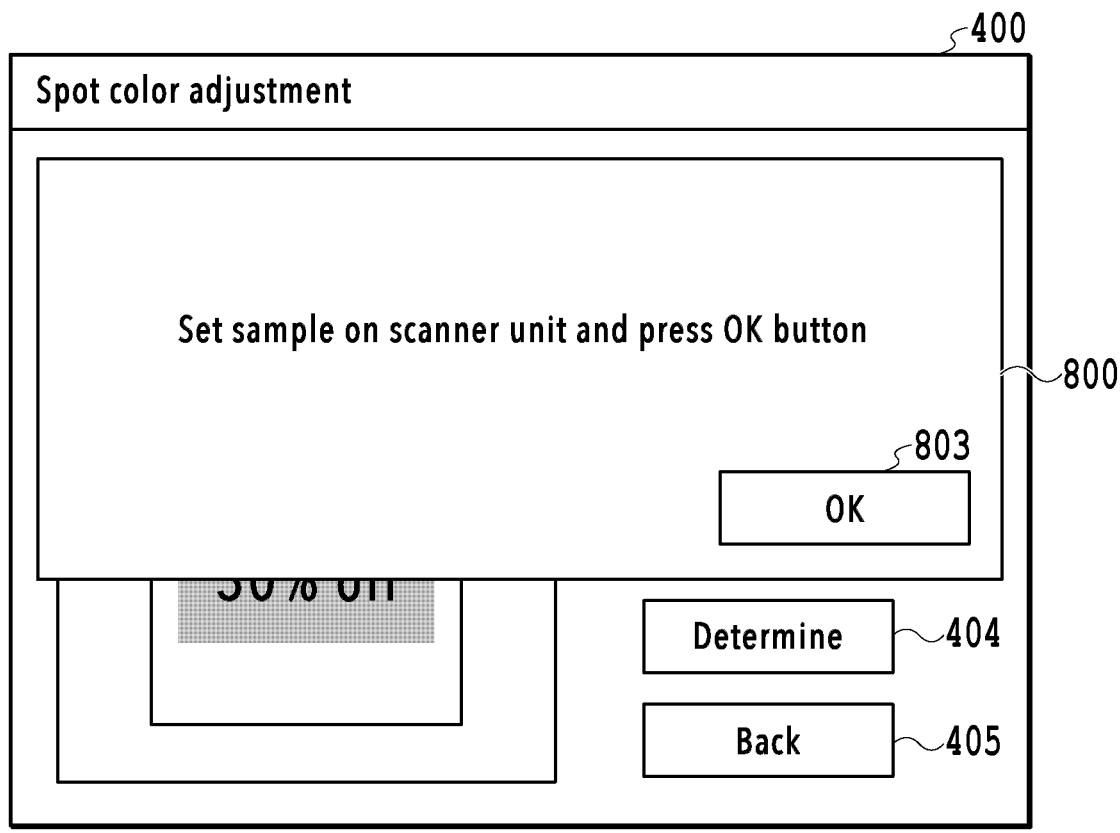
FIG. 8A to FIG. 8C are diagrams showing a state where a message window to prompt reading of a sample is displayed.
Figure 8B:
Figure 8C:
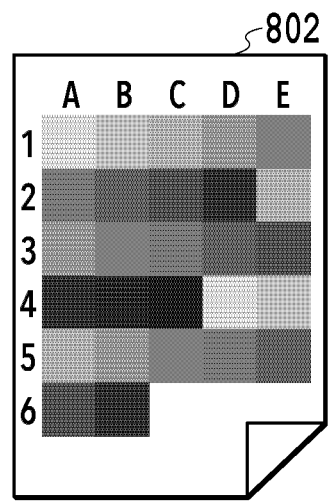
Figure 9:
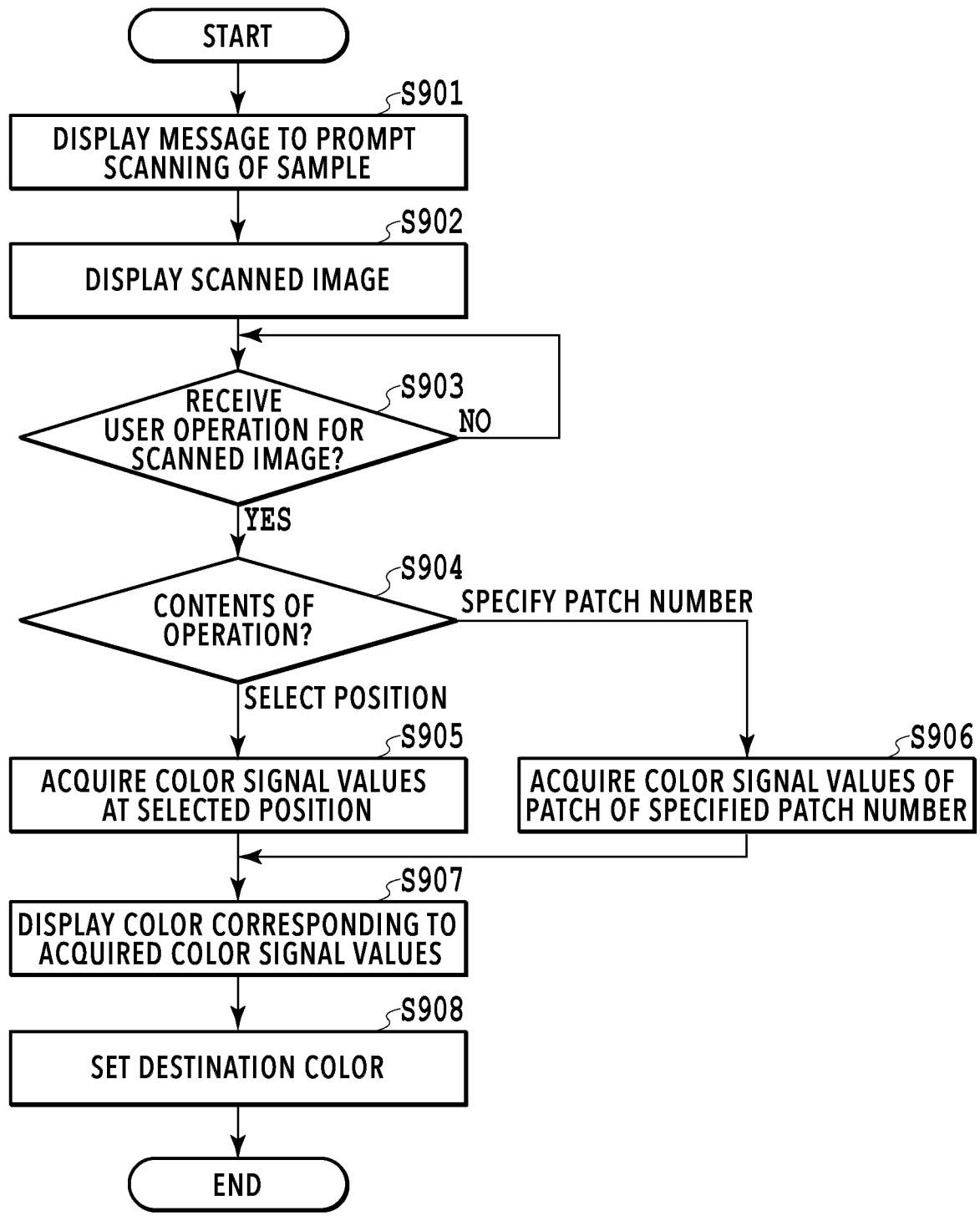
FIG. 9 is a flowchart showing a flow of processing to set a destination color for an adjustment-target color.
Figure 10A:
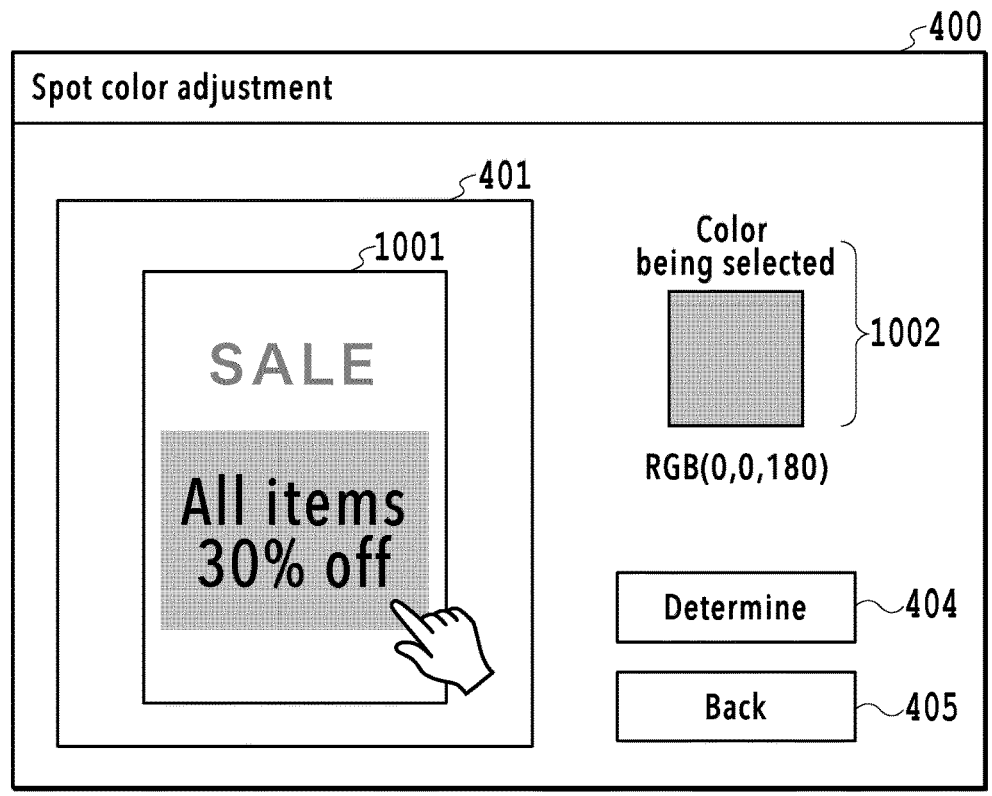
FIG. 10A is a diagram showing a state of a UI screen in a case where a sample document is scanned and FIG. 10B is a diagram showing an example of a UI screen in a case where a color sample is scanned.
Figure 10B:
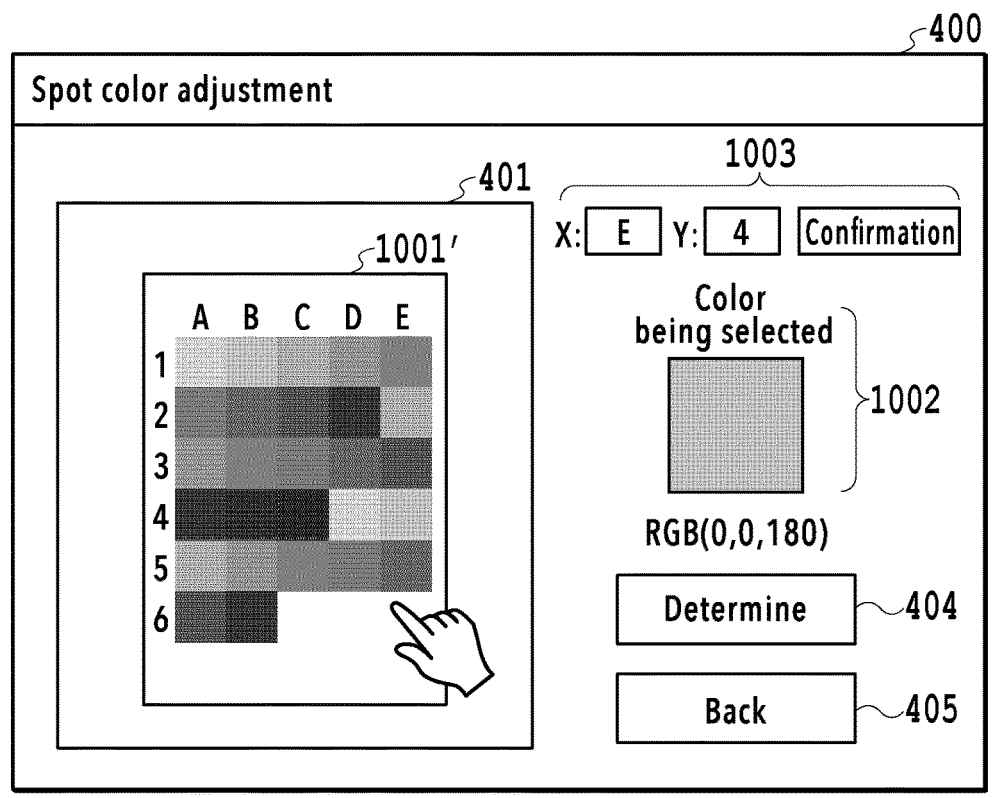

The destination color setting unit 303 sets a color (destination color) that is the destination of the adjustment-target color set by the adjustment-target color setting unit 301. Detailed explanation is given with reference to FIG. 8A and FIG. 9. Symbol "S" in the flowchart in FIG. 9 means a step. First, the destination color setting unit 303 displays a message window 800 to prompt reading of the sample on the UI screen 400 as shown in FIG. 8A (S901). In this case, on a condition that there is a sample document 801 (FIG. 8B) close at hand, a user uses this, and on a condition that the sample document 801 does not exist, the user uses a color sample 802 (FIG. 8C) based on the patch image generated by the color sample generation unit 302. That is, the user sets either the sample document or the color sample on a document reading table (not shown schematically) of the scanner unit 112 and presses down an "OK" button 803 for giving instructions to perform reading. In response to the pressing down of the "OK" button 803, the scanner unit 112 scans the sample document 801 or the color sample 802. The scanned image data obtained by this scan is image data having, for example, a resolution of 600 dpi and in which each pixel is represented by eight bits of RGB. This scanned image data is also converted from the devRGB values that depend on the color reproducibility of the scanner unit 112 into the sRGB color space by using a conversion LUT for the scanner. The scanned image data before and after the conversion is saved in the RAM 103. Next, the destination color setting unit 303 reads the scanned image data after being converted into the sRGB color space from the RAM 103 and displays it on the UI unit 105 (S902). FIG. 10A and FIG. 10B each show a state of the UI screen 400 at the time of destination color setting and FIG. 10A corresponds to a case where the sample document 801 is scanned and FIG. 10B corresponds to a case where the color sample 802 is scanned, respectively. In a case of the UI screen 400 shown in FIG. 10A, a scanned image 1001 of the sample document 801 is displayed within the image display area 401. In a case of the UI screen 400 in FIG. 10B, a scanned image 1001' of the color sample 802 is displayed within the image display area 401. Further, there exists an input box 1003 for specifying the patch number described above in the UI screen 400 in FIG. 10B. Please be noted that a judgement may be made as to whether the UI screen 400 including the input box 1003 is to be displayed based on a feature of the scanned image. Each piece of processing after S903 will be described below. In a case of receiving a user operation for the scanned image 1001 or 1001', branching processing is performed according to the contents of the operation (S903, S904). In a case where the displayed scanned image is the scanned image 1001 of the sample document 801, for example, in a case where a user performs a touch operation to the area of "All items 30% off" in the scanned image 1001 within the image display area 401, color values are acquired based on coordinate information (x, y) corresponding to the position of the touch operation (S905). Each pixel of the scanned image also has the sRGB values, and therefore, the sRGB values at the position selected by the touch operation by the user are acquired. Then, the color corresponding to the acquired sRGB values is displayed in a destination color display area 1002 (S907). At this time, in the vicinity of the destination color display area 1002 (in this example, at the lower portion), the acquired sRGB values (three values of R, G, B. Here, (R=0, G=0, B=180)) are displayed together. The scanned image that is displayed in the image display area 401 and the color that is displayed in the destination color display area 1002 are displayed in the color space of RGB that depends on the monitor device (here, touch panel) by using a monitor color conversion LUT that depends on the monitor device mounted by the UI unit 105. Lastly, in response to the pressing down of the "Determine" button 404 by the user, the color being displayed in the destination color display area 1002 is set as the destination color (S908). Then, the information on the destination color thus set is sent to the output color determination unit 305.

On the other hand, in a case where the displayed scanned image is the scanned image 1001' of the color sample 802, and in a case where the patch number is input through the input box 1003 and the Confirmation button is pressed down, sRGB values, which are color values of the patch at the position corresponding to the patch number, are acquired (S906). The color corresponding to the acquired sRGB values is then displayed in the destination color display area 1002 (S907). Also at this time, the acquired sRGB values (three values of R, G, B. Here, (R=0, G=0, B=180)) are displayed together in the vicinity of the destination color display area 1002 (in this example, at the lower portion). Further, in response to the pressing down of the "Determine" button 404 by the user, the color being displayed in the destination color display area 1002 is set as the destination color (S908). Then, the information on the destination color thus set is sent to the output color determination unit 305.

The color reproduction range acquisition unit 304 acquires information on the color reproduction range of the printer engine 111 from the control command generation unit 202. Here, the color reproduction range of the printer engine 111 means, for example, the range of the colors that the printer engine 111 can represent on the Lab space, which is the standard color space. Here, information on the color reproduction range is acquired in the LUT format that specifies the correspondence relationship between the RGB values in the devRGB color space that depends on the printer engine 111 and the Lab values in the Lab color space.

TABLE 3

| Input (devRGB) | | | Output (Lab) | | |
|---|---|---|---|---|---|
| R | G | B | L | a | b |
| 0 | 0 | 0 | 0.0 | 0.0 | 0.0 |
| 0 | 0 | 16 | 0.6 | 3.7 | −13.6 |
| 0 | 0 | 32 | 2.7 | 17.0 | −37.8 |
| 0 | 0 | 48 | 6.7 | 33.5 | −55.4 |
| 0 | 0 | 64 | 11.9 | 41.8 | −68.5 |
| 0 | 0 | 80 | 16.8 | 49.2 | −80.7 |
| 0 | 0 | 96 | 21.5 | 56.2 | −92.3 |
| 0 | 0 | 112 | 26.0 | 63.0 | −103.3 |
| . | . | . | . | . | . |
| . | . | . | . | . | . |
| . | . | . | . | . | . |

In Table 3 described above, it is assumed that in the Lab values given by real number values, L takes a value between 0.0 and 100.0 and a and b take a value between −127.0 and 128.0. Further, the RGB values, which are input values, take values at discrete positions in the devRGB color space. In a case where RGB values that are not stored as input values are input, by the interpolation calculation using the peripheral values thereof, the Lab values are calculated. The standard color space used to specify the color reproduction range is not limited to the Lab color space and may be another color space, such as the Luv color space specified by the CIE (International Commission on Illumination). Information on the acquired color reproduction range is sent to the output color determination unit 305.

The output color determination unit 305 determines the color that is the output color in a case where the adjustment-target color is input based on information on the adjustment-target color set as described above and the destination color thereof, and information on the color reproduction range of the printer engine 111. First, the output color determination unit 305 determines whether or not the Lab values corresponding to the set destination color fall within the color reproduction range of the printer engine 111. In a case where the results of the determination indicate that the Lab values of the destination color are within the color reproduction range, the output color determination unit 305 determines the color specified by the devRGB values corresponding to the Lab values of the destination color as the output color. On the other hand, in a case where the results of the determination indicate that the Lab values of the destination color are outside the color reproduction range, the output color determination unit 305 determines the color closest to the destination color (that is, the color closest to the color sought for by a user) inside the color reproduction range as the output color. At this time, for example, it may also be possible to generate and display a chart image including a plurality of candidate colors on the UI unit 105 and cause a user to select the color close to the color that is sought for from the chart image. It may also be possible to print and output the chart image and then cause a user to select a desired color. In this manner, the set destination color or the color close thereto is determined as the output color. In a case of the present embodiment, the determined output color is specified by color signal values having three values of R, G, and B in the devRGB color space. Due to this, in a case where an adjustment-target color having predetermined sRGB values is input in the color matching LUT for converting the color space from sRGB into devRGB, devRGB values by which the destination color (or color close thereto) desired by a user are determined. Information on the output color thus determined is sent to the LUT modification unit 306 together with information on the adjustment-target color.

The LUT modification unit 306 modifies the predetermined color matching LUT based on the received information on the adjustment-target color and the output color. For example, it is assumed that the LUT modification unit 306 receives color signal values of sRGB indicating somewhat dark and deep blue (R=0, G=0, B=160) as adjustment-target color information and color signal values of devRGB (R=0, G=0, B=125) as output color information thereon from the output color determination unit 305. In this case, the LUT modification unit 306 modifies the predetermined color matching LUT shown in Table 2 described previously as Table 4 below.

TABLE 4

| Input (sRGB) | | | Output (devRGB) | | |
|---|---|---|---|---|---|
| R | G | B | R | G | B |
| 0 | 0 | 0 | 0 | 0 | 0 |
| 0 | 0 | 16 | 0 | 0 | 16 |
| 0 | 0 | 32 | 0 | 0 | 27 |
| 0 | 0 | 48 | 0 | 0 | 38 |
| 0 | 0 | 64 | 0 | 0 | 49 |
| 0 | 0 | 80 | 0 | 0 | 60 |
| 0 | 0 | 96 | 0 | 0 | 71 |
| 0 | 0 | 112 | 0 | 0 | 82 |
| 0 | 0 | 128 | 0 | 0 | 93 |
| 0 | 0 | 144 | 0 | 0 | 104 |
| 0 | 0 | 160 | 0 | 0 | 125 |
| . | . | . | . | . | . |
| . | . | . | . | . | . |
| . | . | . | . | . | . |

In the color matching LUT shown in Table 4, it is known that the devRGB values of the grid point corresponding to the sRGB values (R=0, G=0, B=160) of the adjustment-target color has been rewritten from (R=0, G=0, B=115) to (R=0, G=0, B=125). The rewriting of the RGB values corresponding to the grid point such as this has the same meaning as changing the conversion characteristic of the color matching LUT. In this manner, a new color matching LUT for implementing color matching processing to put an adjustment-target color close to a color desired by a user is obtained. Here, the devRGB values of one grid point are changed, but moreover, smoothing processing is performed so that the difference from the devRGB values at a grid point in the vicinity thereof is smooth. The new color matching LUT generated as described above, in which the adjustment-target color specified by a user and the output color thereof are associated with each other, is sent to the color conversion unit 204.

According to the present embodiment, in a case where the sample document is close at hand, it is possible to set a destination color by making use of the sample document, and therefore, it is not necessary to perform troublesome work to set a destination color by printing the color sample each time and comparing the color sample with the sample printed material. Further, also in a case where the sample printed material is not close at hand, it is possible to appropriately set a destination color by generating and printing the color sample.

Second Embodiment

In a case where spot color adjustment is performed for a plurality of colors within an input image, selecting an adjustment-target color one by one and performing destination color setting by reading the color sample or the sample document with the scanner unit each time is very troublesome to a user. Consequently, an aspect is explained as a second embodiment in which the setting of a plurality of adjustment-target colors is performed first and then, for the adjustment-target color whose aimed color is included in the sample document, the destination color is set based on the sample document and for the adjustment-target color whose aimed color is not included in the sample document, the color sample is generated automatically. Explanation of the contents in common to those of the first embodiment, such as the basic configuration of the image processing unit 106, is omitted and in the following, processing contents in the spot color adjustment unit 203, which are different points, are explained.

<Details of Spot Color Adjustment Unit>

Figure 11:
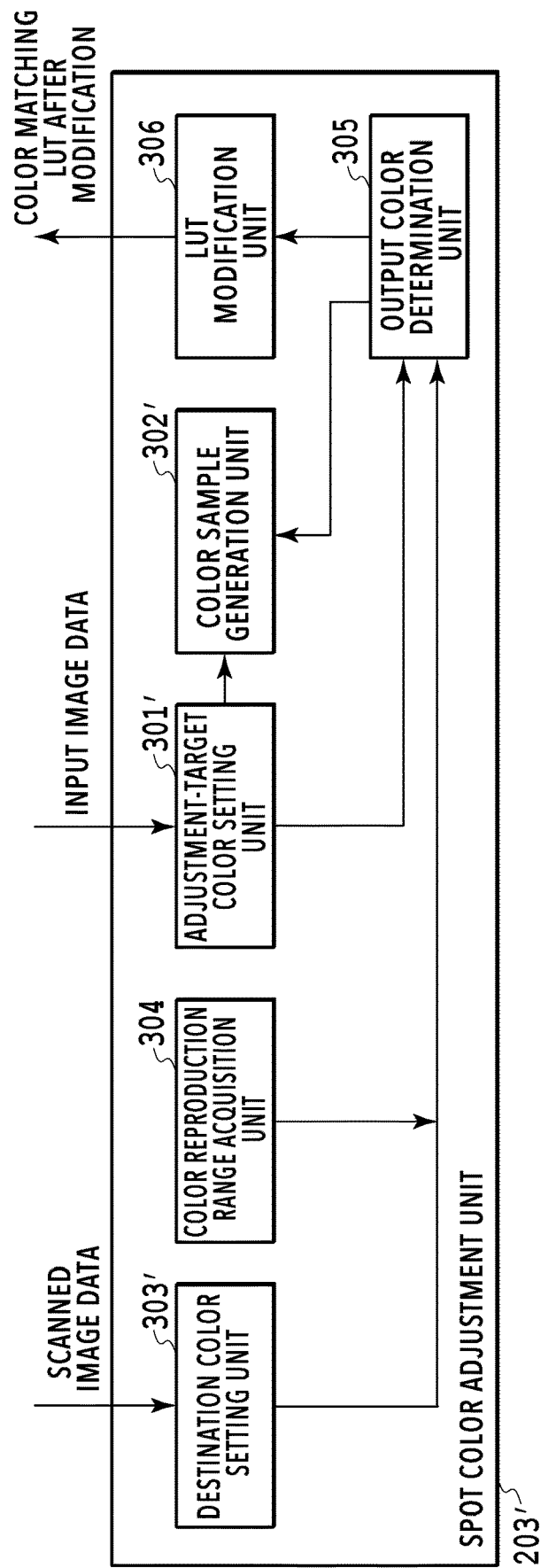
FIG. 11 is a function block diagram showing an internal configuration of a spot color adjustment unit according to a second embodiment.

FIG. 11 is a function block diagram showing an internal configuration of a spot color adjustment unit 203' according to the present embodiment. The spot color adjustment unit 203' of the present embodiment is also configured by the same function block as that of the first embodiment. That is, the spot color adjustment unit 203' has an adjustment-target color setting unit 301', a color sample generation unit 302', a destination color setting unit 303', the color reproduction range acquisition unit 304, the output color determination unit 305, and the LUT modification unit 306. In the following, the adjustment-target color setting unit 301', the color sample generation unit 302', and the destination color setting unit 303', which perform operations partially different from those of the first embodiment, are explained mainly.

Figure 12A:
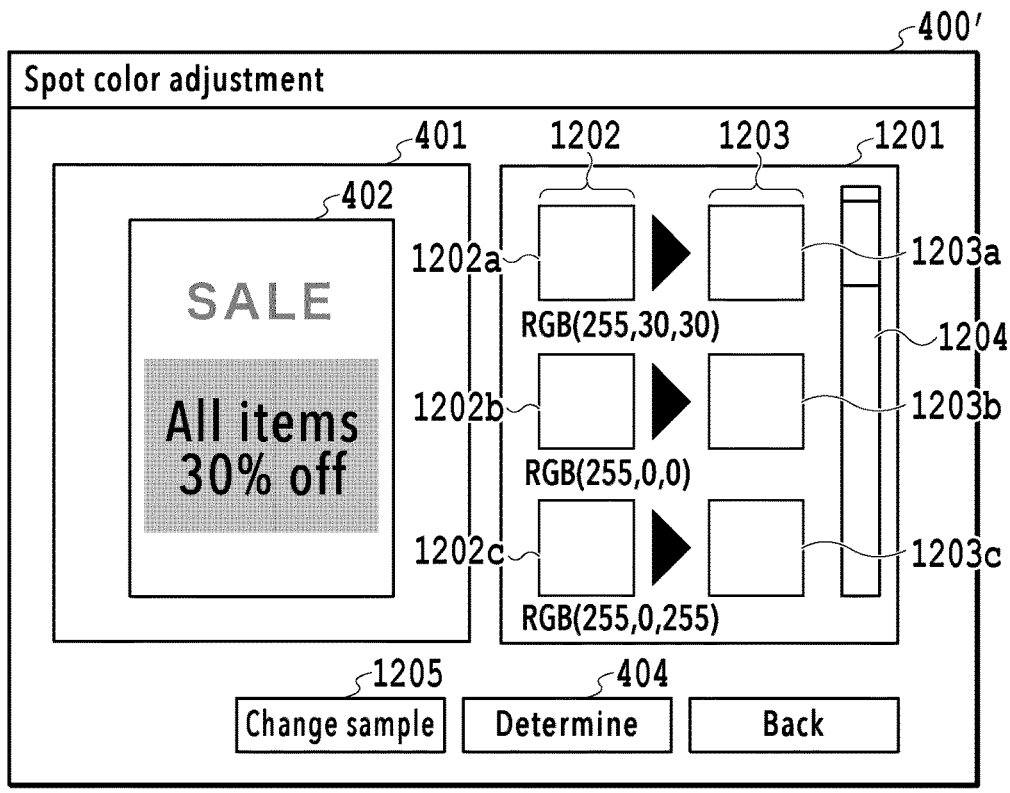
FIG. 12A is a diagram showing a UI screen at the time of setting start of an adjustment-target color and FIG. 12B is a diagram showing a UI screen at the time of setting completion.
Figure 12B:
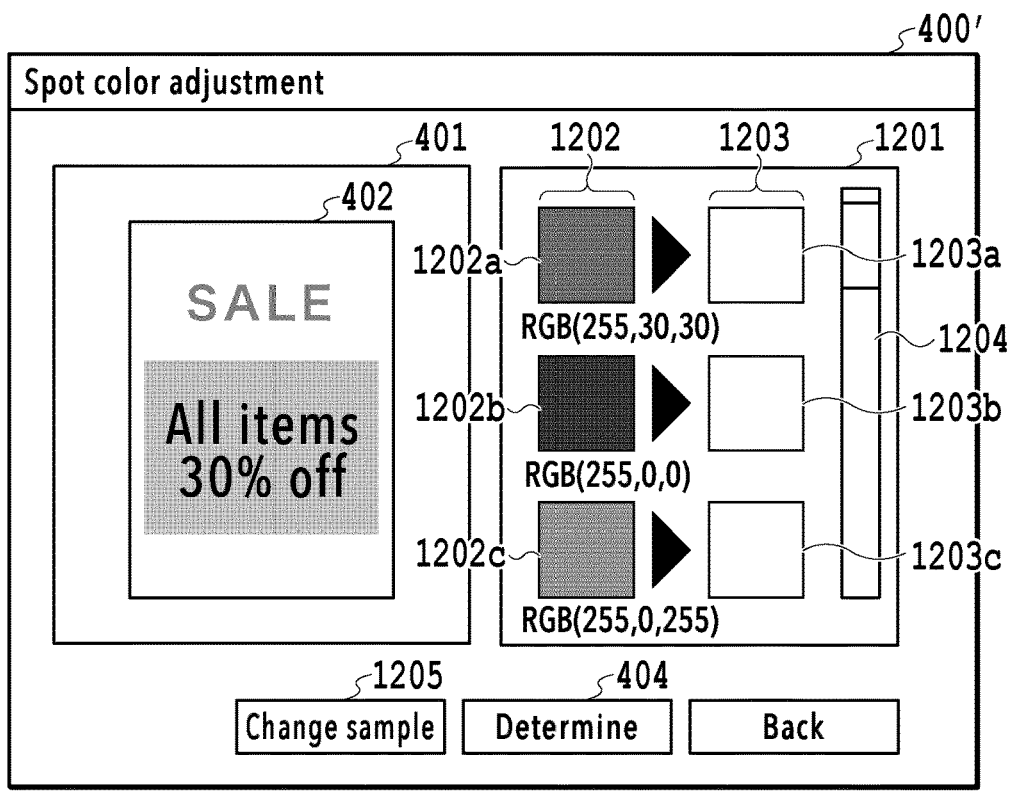

The adjustment-target color setting unit 301' performs processing to set a plurality of adjustment-target colors, which is the target of spot color adjustment, among colors configuring an input image. FIG. 12A is an example of a Spot color adjustment UI screen according to the present embodiment and shows a state at the time of start of adjustment-target color setting. In a case of receiving printing-target input image data from the control command generation unit 202, the adjustment-target color setting unit 301' displays the input image 402 in the image display area 401 within a UI screen 400' as shown in FIG. 12A. The right side of the image display area 401 is a selected color display area 1201 for displaying a plurality of adjustment-target colors relating to user selection and destination colors corresponding thereto. Then, in the selected color display area 1201, an adjustment-target color area 1202 for displaying adjustment-target colors selected by a user and a destination color area 1203 for displaying destination colors selected by a user further exist. The UI screen 400' in FIG. 12A is a UI screen in the situation in which a user does not select anything. Consequently, in each of the adjustment-target color area 1202 and the destination color area 1203, input boxes 1202a to 1202c and 1203a to 1203b in the non-selection state (blank state) are arranged one on to top of another. In a case where an adjustment-target color is set, first, a user selects an arbitrary input box from among the input boxes in the blank state arranged one on to top of another in the adjustment-target color area 1202 by a touch operation or the like. Following the above, in a case where the user selects a specific position of the input image by a touch operation or the like, color values (sRGB values) are acquired based on the coordinate information and the color corresponding to the acquired sRGB values is input to the input box within the adjustment-target color area 1202 selected immediately previously. That is, the input box that has been in the blank state changes to a state where the color selected by the user is attached. In this manner, the first adjustment-target color is set. In a case where there are second and third colors, the user sets a desired number of adjustment-target colors by repeating the same processing. FIG. 12B shows the UI screen 400' in a state where three adjustment-target colors are set. As is previous from a comparison with FIG. 12A, all the three input boxes 1202a to 1202c arranged one on top of another in the adjustment-target color area 1202 are colored. The user having completed the setting of all the adjustment-target colors as described above presses down the "Determine" button 404. By the pressing down of the "Determine" button 404 by the user, information on the plurality of adjustment-target colors set as describe above is sent to the output color determination unit 305. A scroll bar 1204 is used to make it possible to check the plurality of set adjustment-target colors by scrolling the screen in a case where the plurality of set adjustment-target colors is not included within one screen. Further, a "Change sample" button 1205 is made use of to switch the scan-target sample document to another in a case where the aimed color corresponding to each of the plurality of adjustment-target colors is included in separate sample documents.

Figure 13:
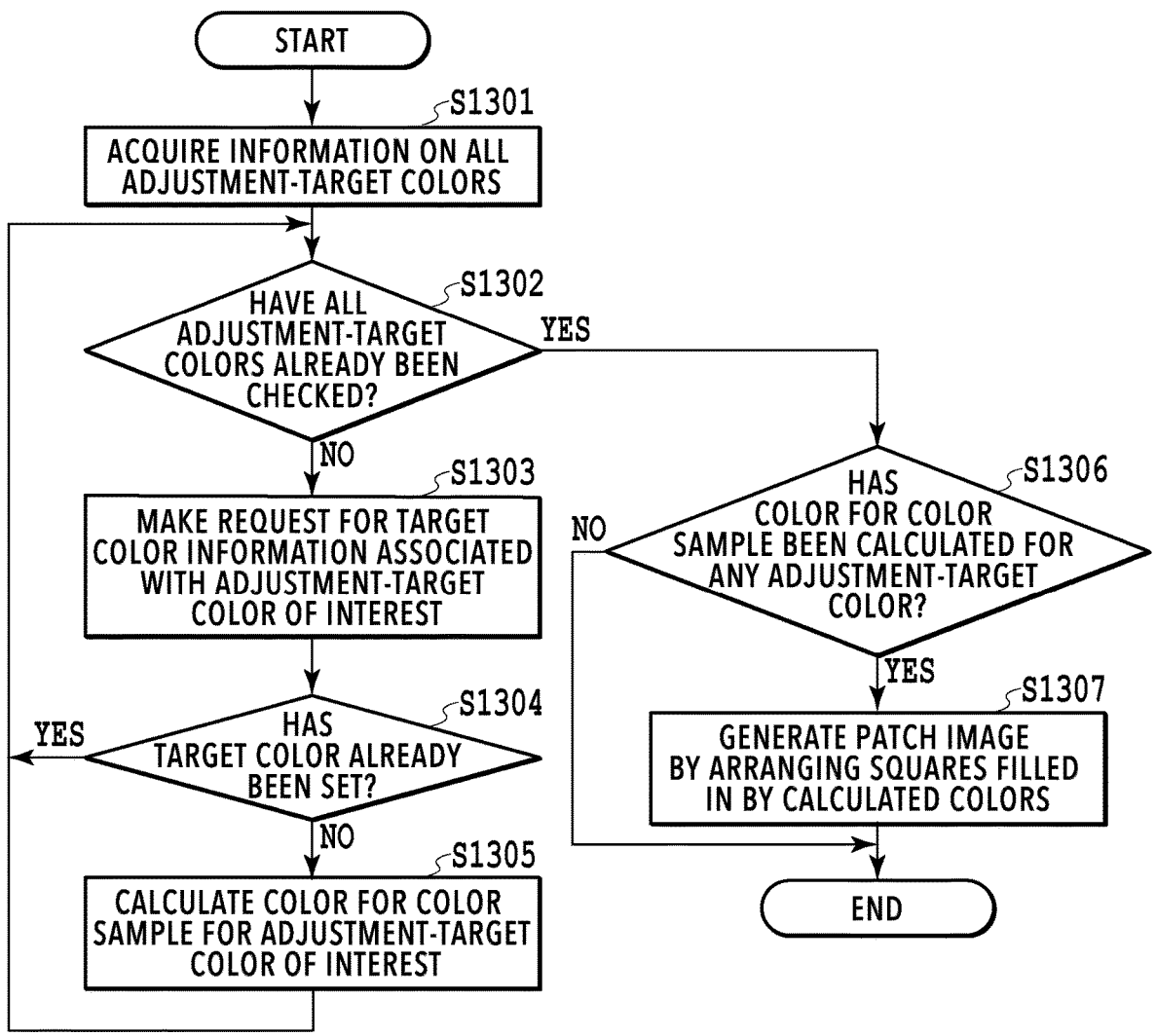
FIG. 13 is a flowchart showing a flow of color sample automatic generation processing.

The color sample generation unit 302' automatically generates a color sample of the adjustment-target color for which it is to generate a color sample among the plurality of adjustment-target colors set by the adjustment-target color setting unit 301'. In other words, the color sample generation unit 302' of the present embodiment does not operate in a case where a destination color is set by using the sample document for each of all the adjustment-target colors set by the adjustment-target color setting unit 301'. Here, the adjustment-target color for which a color sample is performed among the plurality of adjustment-target colors is, for example, a case where the aimed color is not included within the sample document, such as that an appropriate color is not reproduced for part of colors in the sample document. That is, in a case of the present embodiment, first, a user determines a destination color by using the sample document for the adjustment-target color whose aimed color is included in the sample printed material among the plurality of set adjustment-target colors. Then, for the adjustment-target color whose aimed color does not exist in the sample document, a user determines a destination color by using the color sample that is generated automatically. Details of the color sample automatic generation processing, which is a feature of the present embodiment, will be described separately by referring to the flowchart (FIG. 13).

Figure 14A:
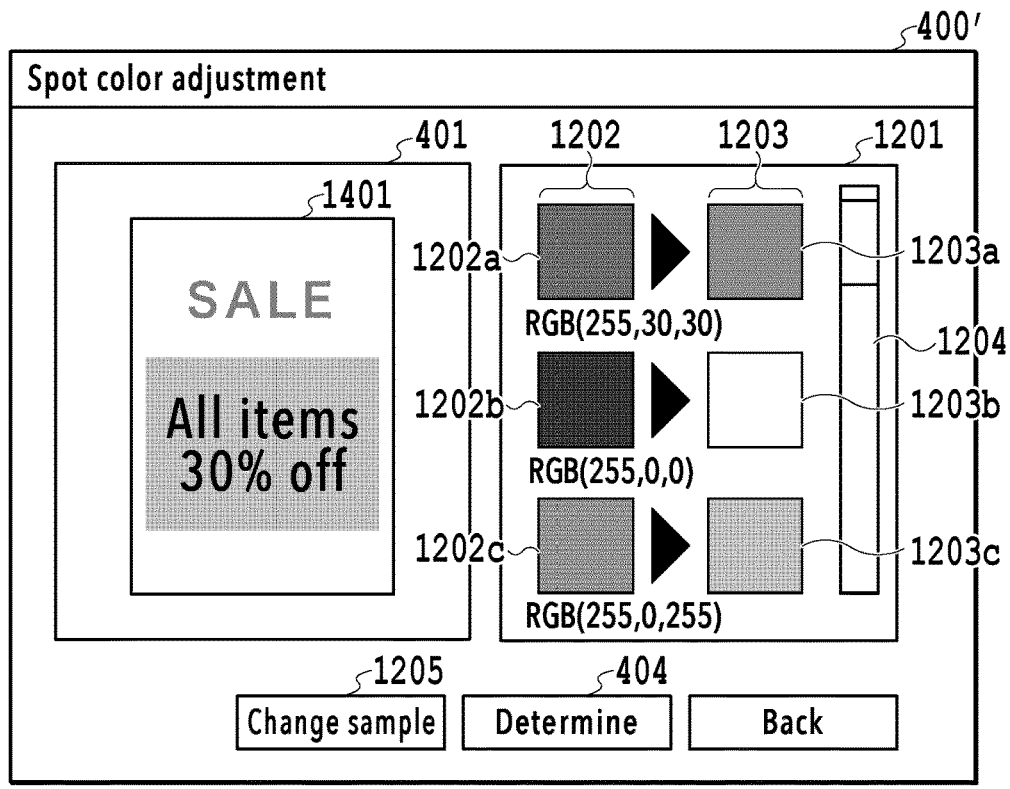
FIG. 14A is a diagram showing a UI screen at the time of setting completion of a destination color based on a sample document and FIG. 14B is a diagram showing a UI screen at the time of setting completion of destination colors for all adjustment-target colors.

The destination color setting unit 303' sets a destination color based on a user operation for each of the plurality of adjustment-target colors set by the adjustment-target color setting unit 301'. First, for the adjustment-target color whose aimed color is represented appropriately in the sample document, a destination color is set based on the sample document. As a specific operation, first, a user scans the sample document by setting the sample document on the scanner unit in accordance with the message window as shown in FIG. 8A described previously. Due to this, a scanned image of the sample document is displayed within the image display area 401 on the UI screen 400' described previously. Next, the user selects an arbitrary input box by a touch operation or the like from the input boxes in the blank state arranged one on top of another in the destination color area 1203 within the selected color display area 1201. Following the above, in a case where the user selects a specific position of the scanned image being displayed by a touch operation or the like, color values (sRGB values) are acquired based on the coordinate information. Then, to the input box within the destination color area 1203 selected immediately previously, a color corresponding to the acquired sRGB values is input. That is, the input box that has been in the blank state changes to a state where the color selected by the user is attached. Then, the user performs the operation such as this for all the adjustment-target colors. In a case where the setting of a destination color is completed for the adjustment-target colors whose aimed colors exist in the sample document in this manner, the user presses down the "Determine" button 404. Here, it is assumed that a destination color is set based on the sample document for the two adjustment-target colors in a situation in which the three adjustment-target colors are set as shown in FIG. 12B described above. FIG. 14A shows the UI screen 400' at this time and among the three input boxes 1203a to 1203c arranged one on top of another in the destination color area 1203, the color is input to the uppermost input box 1203a and the lowermost input box 1203c, respectively. In a case where the "Determine" button 404 is pressed down in this state, the destination color setting unit 303' transmits information on the two set destination colors to the output color determination unit 305 by associating the corresponding adjustment-target colors therewith. The output color determination unit 305 determines the output color for each of the two set destination colors and sends the results to the color sample generation unit 302'. Then, in the color sample generation unit 302', the color sample is generated for the one remaining adjustment-target color for which a destination color is not set yet.

Figure 14B:
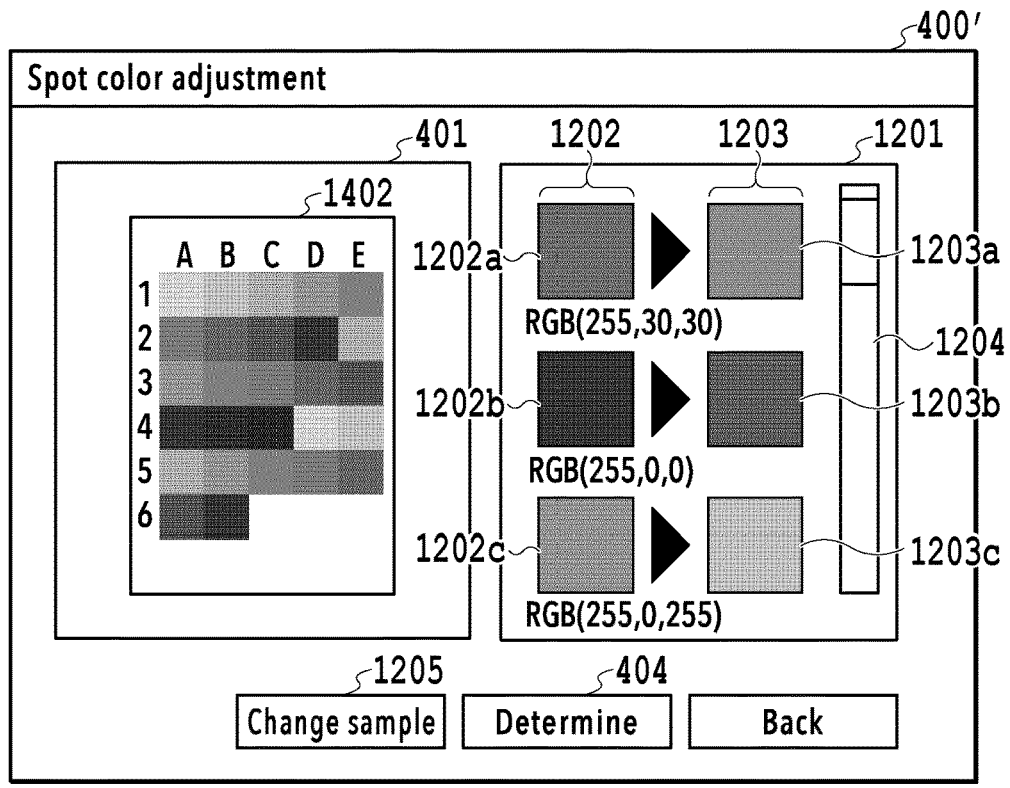

The destination color setting unit 303' sets a destination color based on the color sample generated automatically for the adjustment-target color whose aimed color does not exist in the sample document. Here, it is assumed that the UI screen 400' is in the situation shown in FIG. 14A. In this case, a user selects the input box 1203a that is still in the blank state within the destination color area 1203 by a touch operation or the like. The destination color setting unit 303' having detected the operation displays the message window (see FIG. 8A described previously) to prompt a user to set the color sample on the scanner unit on the UI screen 400'. Then, in a case where the user sets the color sample and gives instructions to perform reading, the color sample is read and scanned image data is generated and the scanned image of the color sample is displayed within the image display area 401. After this, as in the case where the sample document is used, by performing a touch operation or the like to a desired position within the displayed scanned image, the color relating to the touch operation or the like is input also to the input box 1203b and the destination color is set. FIG. 14B shows the UI screen 400' in the state where the destination color is set also to the one remaining color by the destination color setting based on the color sample and the destination color setting processing for all the three adjustment-target colors is completed.

At the point in time at which it is settled that the destination color setting is not performed based on the sample document, it may also be possible to highlight the input box that is still in the blank state within the destination color area 1203 by thickening its outer frame, to display a character string of "not set yet" in an overlapping manner, and so on. Due to this, for example, in a case where the inside of the input box in the blank state is displayed in "white", it is possible for a user to easily recognize that the destination color is not set yet even though the aimed color of the adjustment-target color is a color close to white.

<Color Sample Automatic Generation Processing>

Following the above, with reference to the flowchart in FIG. 13, color sample automatic generation processing by the color sample generation unit 302 according to the present embodiment is explained in detail. As described previously, the execution of the flow shown in FIG. 13 is started in a case where the destination color setting processing is completed for the adjustment-target colors whose aimed colors exist within the sample document and a user presses down the "Determine" button 404, which serves as a trigger.

First, at S1301, information on all the adjustment-target colors set by a user is acquired from the output color determination unit 305. At S1302 that follows, whether preparation processing at S1303 to S1305 is completed for all the adjustment-target colors specified by the information acquired at S1301 is determined. In a case where the preparation processing is completed, the processing advances to S1306 and in a case where the preparation processing is not completed, the processing advances to S1303.

At S1303 in a case where the preparation processing is not completed, a request for the destination color information on the adjustment-target color of interest among all the adjustment-target colors is made to the output color determination unit 305. The output color determination unit 305 having received the request returns, in a case where the destination color information associated with the adjustment-target color of interest has already been received from the destination color setting unit 303', the information to the color sample generation unit 302'. On the other hand, in a case where the destination color information has not been received (that is, in a case where the destination color is not set yet for the adjustment-target color of interest), the output color determination unit 305 returns, for example, an error signal indicating that to the color sample generation unit 302'.

At S1304, whether it has been possible to acquire the destination color information on the adjustment-target color of interest is determined. In a case where it has been possible to acquire the destination color information, the processing returns to S1302. On the other hand, in a case where it has not been possible to acquire the destination color information, the processing advances to S1305.

At S1305, a plurality of colors obtained by changing the adjustment-target color of interest is calculated, which is for generating a color sample of the adjustment-target color of interest. At this time, as in the first embodiment, for example, 27 colors including the adjustment-target color are calculated.

At S1306 in a case where the above-described preparation processing is completed for all the adjustment-target colors, whether the calculation of the color for the color sample (patch image) has been performed for any adjustment-target color of interest is determined. In a case where the adjustment-target color for which the calculation of the color for the color sample has been performed exists, the processing advances to S1307. On the other hand, in a case where the adjustment-target color for which the calculation of the color for the color sample has been performed does exist, this processing is terminated.

At S1307, by using the colors calculated at S1305 for each adjustment-target color, the patch image for the color sample the same as that in the first embodiment is generated. At this time, in a case where the calculation of the colors for the color sample has been performed for a plurality of adjustment-target colors, it is only required that the correspondence relationship between each adjustment-target color and the calculated color be known. That is, it is not necessarily required that one-page patch image be generated for each adjustment-target color and a plurality of adjustment-target colors may be included on one page. Then, as in the first embodiment, the patch image data for which the conversion using the color matching LUT has been performed is sent to the printer engine 111 via the control command generation unit 202 and printed and output, and thereby, a color sample corresponding to one or a plurality of adjustment-target colors is obtained.

The above is the contents of the color sample automatic generation processing according to the present embodiment.

According to the present embodiment, in a case where there is a plurality of adjustment-target colors, it is not necessary to repeat the operation to select a destination color from a scanned image of a sample printed material for each color. Further, in a case where there is an adjustment-target color whose aimed color does not exist in the sample printed material, a color sample is generated automatically. Consequently, it is possible to reduce the operation load of a user considerably.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a case where there is a sample printed material, it is possible to set a destination color by making use of the printed material and also in a case where there is no sample printed material, it is possible to set a destination color based on a color sample.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-222038, filed Dec. 9, 2019 which is hereby incorporated by reference wherein in its entirety.

What is claimed is:

1. An image processing apparatus that adjusts a conversion characteristic in color matching processing in a case where an image output apparatus outputs image data, the image processing apparatus comprising:
   a first setting unit configured to set a color selected by a user from among colors included in the image data to be output as an adjustment-target color;
   a second setting unit configured to set a color selected by a user from among colors included in scanned image data obtained by reading a reference sample as a destination color for the adjustment-target color; and
   a first generation unit configured to generate a conversion rule to convert the adjustment-target color into the destination color; wherein
   the second setting unit has:
      a function to set the destination color based on first scanned image data obtained by reading a color sample as the reference sample, in which patches of a plurality of colors including colors around the adjustment-target color are printed; and
      a function to set the destination color based on second scanned image data obtained by reading a sample document of the image data to be output as the reference sample.

2. The image processing apparatus according to claim 1, further comprising:
   a display unit configured to display the first scanned image data or the second scanned image data based on user instructions, wherein
   the second setting unit sets a color selected by a user based on displayed scanned image data as the destination color.

3. The image processing apparatus according to claim 1, further comprising:

a second generation unit configured to generate patch image data that is a base of the color sample used in a case where the destination color is set based on the first scanned image data.

4. The image processing apparatus according to claim 3, wherein
the second generation unit:
acquires information on the set adjustment-target color from the first setting unit;
calculates a plurality of colors obtained by changing the adjustment-target color specified by acquired information; and
generates the patch image in which patches corresponding to the plurality of calculated colors are arranged.

5. The image processing apparatus according to claim 3, wherein the second generation unit generates the patch image data based on user instructions.

6. The image processing apparatus according to claim 3, wherein
in a case where a plurality of adjustment-target colors is set by the first setting unit, on a condition that setting of the destination color based on the second scanned image data is performed by the second setting unit for part of the plurality of adjustment-target colors, the second generation unit generates the patch image of remaining adjustment-target colors among the plurality of adjustment-target colors, for which the destination color is not set yet, without based on user instructions.

7. The image processing apparatus according to claim 1, wherein
the change unit changes a conversion characteristic in a lookup table in which an input signal value and an output signal value for the color matching processing are associated with each other so that an output signal value corresponding to an input signal value indicating the adjustment-target color becomes an output signal value indicating the destination color or a color as close as possible to the destination color.

8. The image processing apparatus according to claim 7, further comprising:
an acquisition unit configured to acquire information on a color reproduction range of the image output apparatus, wherein
the change unit performs the change so that the output signal values obtained by the change fall within a color reproduction range specified by acquired information.

9. The image processing apparatus according to claim 7, wherein
the image output apparatus is an image forming apparatus that forms an image in accordance with the input image data on a printing medium by using color materials.

10. A method of an image processing apparatus that adjusts a conversion characteristic in color matching processing in a case where an image output apparatus outputs image data, the method comprising:
first setting a color selected by a user from among colors included in the image data to be output as an adjustment-target color;
second setting a color selected by a user from among colors included in scanned image data obtained by reading a reference sample as a destination color for the adjustment-target color; and
generating a conversion rule to convert the adjustment-target color into the destination color, wherein
the second setting includes:
setting the destination color based on first scanned image data obtained by reading a color sample as the reference sample, in which patches of a plurality of colors including colors around the adjustment-target color are printed; and
setting the destination color based on second scanned image data obtained by reading a sample document of the image data to be output as the reference sample.

11. The method according to claim 10, further comprising:
displaying the first scanned image data or the second scanned image data based on user instructions,
wherein the second setting sets a color selected by a user based on displayed scanned image data as the destination color.

12. The method according to claim 10, further comprising:
generating patch image data that is a base of the color sample used in a case where the destination color is set based on the first scanned image data.

13. The method according to claim 10, wherein the changing changes a conversion characteristic in a lookup table in which an input signal value and an output signal value for the color matching processing are associated with each other so that an output signal value corresponding to an input signal value indicating the adjustment-target color becomes an output signal value indicating the destination color or a color as close as possible to the destination color.

14. A non-transitory computer readable storage medium storing a program for causing a computer to perform a control method of an image processing apparatus that adjusts a conversion characteristic in color matching processing in a case where an image output apparatus outputs image data, the control method comprising the steps of:
first setting a color selected by a user from among colors included in the image data to be output as an adjustment-target color;
second setting a color selected by a user from among colors included in scanned image data obtained by reading a reference sample as a destination color for the adjustment-target color; and
generating a conversion rule to convert the adjustment-target color into the destination color, wherein
the second setting includes:
setting the destination color based on first scanned image data obtained by reading a color sample as the reference sample, in which patches of a plurality of colors including colors around the adjustment-target color are printed; and
setting the destination color based on second scanned image data obtained by reading a sample document of the image data to be output as the reference sample.

15. The non-transitory computer readable storage medium according to claim 14, further comprising:
displaying the first scanned image data or the second scanned image data based on user instructions,
wherein the second setting sets a color selected by a user based on displayed scanned image data as the destination color.

16. The non-transitory computer readable storage medium according to claim 14, further comprising:
generating patch image data that is a base of the color sample used in a case where the destination color is set based on the first scanned image data.

17. The non-transitory computer readable storage medium according to claim 14, wherein the changing changes a conversion characteristic in a lookup table in which an input signal value and an output signal value for the color matching processing are associated with each other so that an output signal value corresponding to an input signal value indicating the adjustment-target color becomes an output signal value indicating the destination color or a color as close as possible to the destination color.

\* \* \* \* \*